US009560122B1

United States Patent
Perry et al.

(10) Patent No.: US 9,560,122 B1
(45) Date of Patent: Jan. 31, 2017

(54) SECURE NATIVE APPLICATION MESSAGING WITH A BROWSER APPLICATION

(71) Applicant: GOOGLE INC., Mountain View, CA (US)

(72) Inventors: Matthew Perry, San Francisco, CA (US); Aaron S. Boodman, San Francisco, CA (US); Sergey Yurevich Ulanov, Bellevue, WA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 15/011,899

(22) Filed: Feb. 1, 2016

Related U.S. Application Data

(63) Continuation of application No. 14/020,011, filed on Sep. 6, 2013, now Pat. No. 9,280,677.

(51) Int. Cl.
| | | |
|---|---|---|
| *G06F 21/00* | (2013.01) | |
| *H04L 29/08* | (2006.01) | |
| *H04L 12/58* | (2006.01) | |
| *H04L 29/06* | (2006.01) | |
| *G06F 9/445* | (2006.01) | |
| *G06F 21/51* | (2013.01) | |

(Continued)

(52) U.S. Cl.
CPC ............... *H04L 67/10* (2013.01); *G06F 8/61* (2013.01); *G06F 21/128* (2013.01); *G06F 21/51* (2013.01); *G06F 21/629* (2013.01); *H04L 51/046* (2013.01); *H04L 63/102* (2013.01); *H04L 67/02* (2013.01)

(58) Field of Classification Search
CPC ...... G06F 21/51; G06F 21/121; G06F 21/128; G06F 21/12; G06F 21/62; G06F 21/629
See application file for complete search history.

(56) References Cited

U.S. PATENT DOCUMENTS

| | | |
|---|---|---|
| 2006/0075469 A1 | 4/2006 | Vayman |
| 2012/0222003 A1 | 8/2012 | Shukla et al. |
| 2013/0239231 A1* | 9/2013 | Korycki ................. H04L 67/02 726/29 |

OTHER PUBLICATIONS

Google, "Message Passing—Google Chrome", available online at <https://developer.chrome.com/trunk/extensions/messaging.html#native-messaging>, retrieved on Jun. 25, 2013, 7 pages.

(Continued)

*Primary Examiner* — Edward Zee
(74) *Attorney, Agent, or Firm* — Brake Hughes Bellermann LLP

(57) ABSTRACT

A system for securely mediating messages between a native application and a browser application on a computing device includes running the browser application and a browser process that controls access by the browser-based application to the native resource. The browser process may use a data file distributed with the native application to allow or deny communications between the browser-based application and the native application. When communications are allowed the browser-based application accesses the native resource via the native application. In one implementation, the browser process may initiate a native messaging host and send communication requests to the native messaging host. The data file may be downloaded with the native application or separately from the native application from a site that distributes the native application or a site controlled by the developer of the native application. The data file identifies browser-based applications allowed to communicate with the native application.

20 Claims, 5 Drawing Sheets

(51) Int. Cl.
　　　*G06F 21/62*　　　(2013.01)
　　　*G06F 21/12*　　　(2013.01)

(56) References Cited

OTHER PUBLICATIONS

Google, "Message Passing—Google Chrome", available online at <http://web.archive.org/web/20130326210613/http://developer.chrome.com/extensions/messaging.html>, retrieved on Mar. 12, 2014, 6 pages.
Non-Final Office Action received for U.S. Appl. No. 14/020,011, mailed on Jul. 10, 2015, 12 pages.
Notice of Allowance received for U.S. Appl. No. 14/020,011, mailed on Oct. 30, 2015, 8 pages.

* cited by examiner

SECURE NATIVE APPLICATION MESSAGING WITH A BROWSER APPLICATION

CROSS-REFERENCE TO RELATED APPLICATION

This application is a Continuation of, and claims priority to, U.S. Pat. No. 9,280,677, filed on Sep. 6, 2013, entitled "SECURE NATIVE APPLICATION MESSAGING WITH A BROWSER APPLICATION," the disclosure of which is incorporated by reference herein in its entirety.

TECHNICAL FIELD

This application generally relates to web browser technology.

BACKGROUND

Use of the World Wide Web continues to increase, as does the amount and variety of content that is available to its users. Users of the World Wide Web commonly use browsers (web browsers) implemented on a web-enabled computing device to access content. Such devices include personal computers, laptop computers, netbook computers, entertainment devices, such as televisions, game consoles, and DVD players with internet access, smartphones and cell phones, among a number of other possible devices. Such web browsers are configured to read programmatic code and render that code as web pages, which may include rendering both audio and visual content contained in various media files (e.g., image, video and audio files), as well as performing other functions defined in the programmatic code. Web pages are generally implemented using programming languages such as HTML (including HTML5), CSS and JavaScript, among a number of other available programming languages.

Browser-based applications, also referred to as web applications or web extensions, are software applications that may be designed to run in a web browser or with a browser-based runtime environment. Such applications are often available through a web store that may cater to a specific browser or a browser-based runtime environment. For increased security, some browsers run browser-based applications in a sandboxed environment so that the browser strictly controls access to system resource by the browser-based applications. Accordingly, such applications may not be able to save files or manipulate system hardware, such as a camera.

Native applications are software applications that run on a personal computing device and do not require a browser or a browser-based runtime to execute. Native applications may generally run without restrictions. Some native application developers desire to allow communications between web applications and native applications. For example, a native application developer may desire to reuse existing legacy or proprietary code in the native application from a browser-based application. Browser-based applications can use Netscape Plugin Application Programming Interface (NPAPI) plugins to communicate with native applications. But NPAPI is not supported by all platforms, is planned for future deactivation, and comes with security risks such as exposing the native application functions to unwanted or objectionable extensions or web applications. For example, code running in with NPAPI has the full permissions of the current user and is not sandboxed or shielded from malicious input. Therefore, an attacker might be able to exploit vulnerability in the extension or web application to install malicious software on the user's machine.

SUMMARY

Systems and methods enable a native application provider to regulate communications between a browser-based application and a native application without the security risks of NPAPI. For example, a client computing device can include a native application and a data file provided with the native application for identifying browser-based applications authorized to communicate with the native application. The data file provided with the native application may be a manifest file. The data file and a native application host may be delivered with the native application as part of the installation or upgrade process for the native application. The data file, such as the manifest file, may be installed at a secure location, e.g. one that is writable only by the administrator or root user, making it more difficult to install a counterfeit manifest file. The data file provided with the native application identifies an executable, such as a native application messaging host or the native application itself, and the browser-based applications permitted to communicate with the native application. The data file provided with the native application, may also specify a communication interface as well as other information.

When a browser-based application initiates communication with the native application, the browser-based application generates a message that identifies the native application or its messaging host. The system may locate a manifest file associated with the native application and look for an identifier of the browser-based application in the file to determine if the application is authorized to communicate with the native application. If communications are not authorized, the system may ignore the communication request, log the unauthorized communication request, send a message to a web store operator regarding the unauthorized request, etc. If the communications are authorized, the system may launch the native application messaging host, forward communication requests to the host for further processing, etc. In some implementations, a web store for browser-based applications may monitor applications that use native messaging so that such applications can be audited. In some implementations, the communication request may be limited to a text message, e.g. in a JavaScript Object Notation (JSON) structure.

According to one general aspect, a method for mediating a communication request between a native application and a browser-based application on a computing device includes receiving, using at least one processor, the communication request from the browser-based application. The request specifies a native application messaging host. The method also includes determining, using the at least one processor and based on a data file distributed with the native application, whether the browser-based application is authorized to communicate with the native application and forwarding the communication request to the native application messaging host when it is determined that the browser-based application is authorized.

Implementations can include one or more of the following features. For example, the method may also include generating an error response to the communication request when it is determined that the browser-based application is not authorized and sending the error response to the browser-based application without forwarding the communication request. In some implementations, the method may include writing an audit record when it is determined that the browser-based application is not authorized. As another example, the data file distributed with the native application may be included in an installation bundle with the native application or the method may include starting the native application messaging host in a separate process when it is determined that the browser-based application is authorized. In some implementations the communication request is forwarded as a text message and the browser-based application may use standard in and standard out to communicate with the native application messaging host. In some implementations the native application may be an application that runs independently of browser technologies.

As another example, the data file distributed with the native application may be a manifest file associated with the native application messaging host and the browser-based application is authorized when it is identified in the manifest file. The manifest file may be copied to a secure location on the computing device as part of installing the native application. In some implementations determining whether the browser-based application is identified in the manifest file includes determining that the native application messaging host specified in the communication request is associated with the manifest file and sending a response to the browser-based application indicating the communication request was in error when no manifest file associated with the native application messaging host exists on the computing device. In some implementations the computing device includes a registry key that specifies an identifier for the native application messaging host and a corresponding value for the registry key specifying a location of the manifest file, and wherein the native application messaging host specified by the browser-based application matches the registry key.

According to yet another general aspect, a system for mediating communication requests between a native application and a browser-based application includes at least one processor, a native resource, and memory storing instructions that, when executed by the at least one processor, cause the system to perform operations. The operations may include running a browser-based application and running a browser process. The browser process controls access to the native resource by the browser-based application and uses a data file distributed with the native application to allow or deny communications between the browser-based application and the native application, so that the browser-based application accesses the native resource via the native application when communications are allowed.

Implementations can include one or more of the following features. For example, the data file distributed with the native application may be a manifest file associated with a messaging host for the native application and the browser process may allow communications when the browser-based application is identified in the manifest file. In some implementations the manifest file is copied to a secure location as part of installing the native application and the secure location may be a secure directory predetermined by the browser process. As another example, the browser-based application accesses the native resource using a communication request to a native application messaging host associated with the native application. In some implementations, the communication request specifies the native application messaging host and the data file distributed with the native application identifies the native application messaging host and the browser-based application.

According to another aspect, a system includes at least one processor; a native resource, and memory storing a native application and a manifest file distributed with the native application. The manifest file includes an identifier for a native application messaging host distributed with the native application, a location for the native application messaging host, and an identifier for at least one browser-based application. A browser-based application can access the native resource via the native application when the manifest file includes an identifier for the browser-based application. In some implementations the manifest file further includes a communication type and the browser-based application accesses the native resource via a text message using the communication type.

In one general aspect, a computer program product embodied on a computer-readable storage device that does not include transitory propagating signals includes instructions that, when executed by at least one processor, cause a computing device to perform any of the disclosed methods, operations, or processes. In another general aspect, a system and/or method for message passing between browser-based applications and native applications, substantially as shown in and/or described in connection with at least one of the figures, as set forth more completely in the claims.

Advantages of one or more implementations described here include allowing a browser-based application to take advantage of functionality in a native application without giving unrestricted access to the computing device through the browser-based application. This maintains a more secure environment, decreasing the chance that a user of the computing device will have malware installed on their computing device and mitigating unauthorized access to user files.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
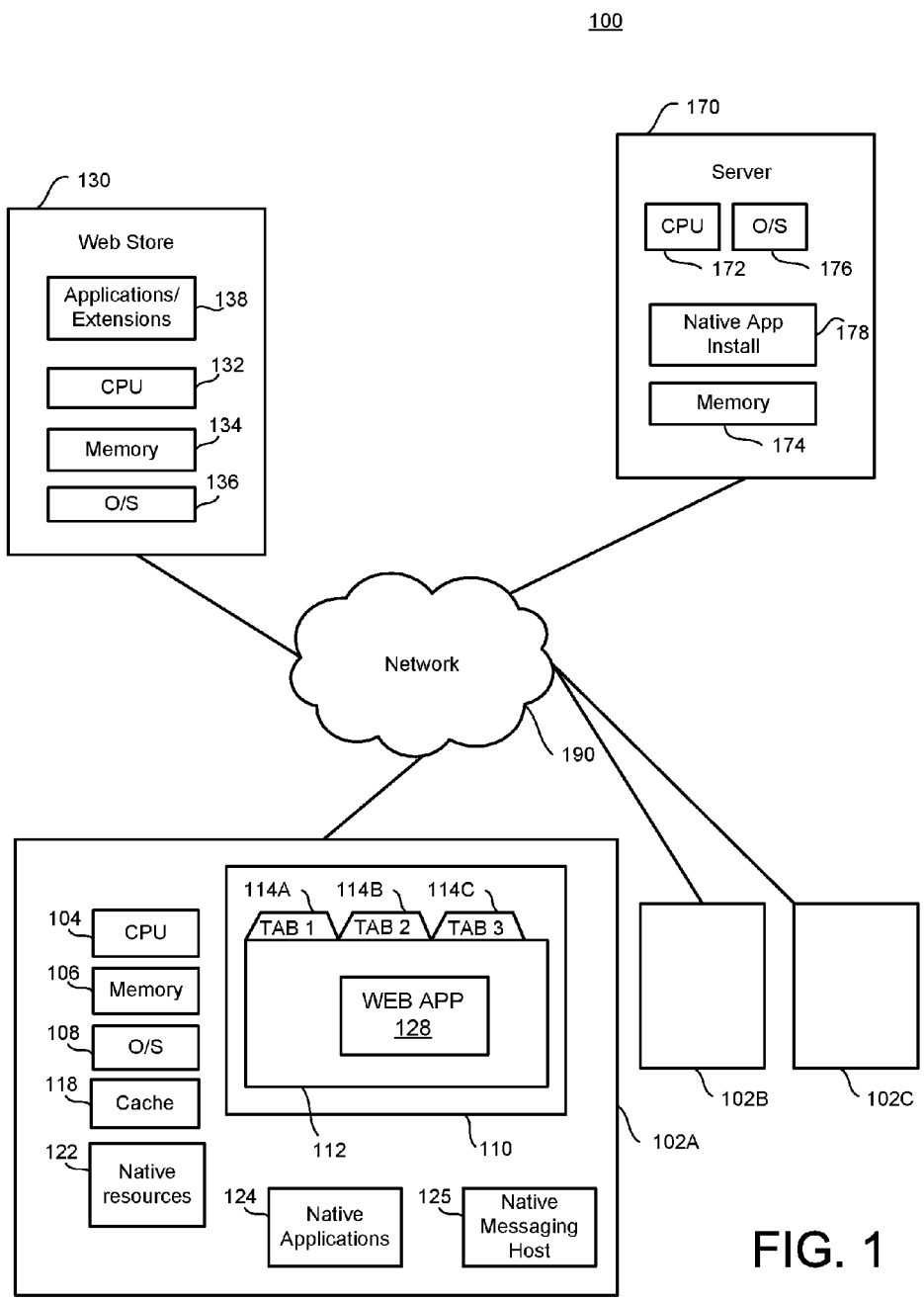
FIG. 1 is a block diagram illustrating an exemplary computing system with a web browser that implements messaging between a browser-based application and a native application.

In various implementations, a web browser may include or be associated with one or more web applications. In this context, a "web application" may be configured to perform a single task or multiple tasks for a user. In such an implementation, the web application may be configured to be executed or interpreted by the web browser and may or may not use the web browser interface. This is compared with the native applications that include machine executable code and are configured to be executed directly by a processor or via the operating system of the computing device, whereas, a web application may be incapable of execution or display without the aid of the web browser or browser-based runtime. Thus, web applications can be run inside a browser with a native-looking user interface or a browser-looking user interface, and may provide functionality and an experience that is more rich and interactive than a standalone website but are less cumbersome and monolithic than a desktop or native application. Examples of web applications include games, photo editors, and video players, and remote desktop applications that are run inside the browser environment.

Web applications can be "hosted web applications," "installable web applications," "packaged web applications," or "platform applications." Hosted web applications may include at least a portion of a website that itself includes web pages, plus some metadata that may be especially pertinent to the web application or to the user of the web application to allow the web application to perform some particular functionality for the user.

Installable web applications are a way of making a browser treat certain websites like applications. Many installable web applications are hosted web applications with extra metadata (such as a small manifest file that describes the application). Packaged web applications are a type of installable web application. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications may have an interface that looks like a native application, but the underlying code relies on the browser environment.

In various examples, the web browser may include or be configured to interact with one or more browser extensions. In this context, a "browser extension" may include one or more web pages packaged or grouped together as a definable whole, and configured to extend the functionality to the web browser. As described herein, "browser extensions" are small software programs that can modify and enhance the functionality of a web browser. They may be written using web technologies such as HTML, JavaScript, and CSS. Extensions may have little or no user interface. Extensions may provide a user interface icon or other user interface that may modify a browser's "chrome", which is defined herein to include an area outside of a webpage displayed in the browser (such as the borders of a web browser window, which include the window frames, menus, toolbars and scroll bars).

Thus, browser extensions also provide extra functionality to a browser, but generally, unlike web applications, there is little or no user interface component to the functionality provided by an extension. Instead, browser extensions extend the functionality of the browser and the websites being viewed in it. For example, browser extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension may display a larger-size version of the image when a user hovers a cursor over a thumbnail image on a webpage executed by a browser until the user moves the cursor away from the image. In another example, and extension may be installed to embed a "mail this" button next to every link in every page. Compared to web applications, extensions cut across websites and web applications. Extensions are usually in effect across all websites, although some are site-specific. Web applications do not combine with other web applications in this way. Rather, web applications run standalone, like any regular website. Packaged web applications and installable web applications are also different from browser extensions because they present very different user interfaces. Browser extensions, packaged web applications, and installable web applications may be distributed via a trusted web store, or via individual websites. The various types of web applications and browser extensions may all be considered browser-based applications and may communicate with a native application using the techniques described below.

Platform applications may operate using a browser-based runtime environment, which is described in more detail below. The platform applications may be configured to be executed directly by a processor of the computing device using the browser-based runtime. Because platform applications are coded with web technologies, no compilation step is required. Instead, platform applications may simply be packaged (e.g., in a. CRX format, or zipped, for example with some signature or verification) and provided to the computing device, for example via web browser, from a digital marketplace. The browser-based runtime may accept the platform application as a packaged file (e.g., .CRX file) and then execute the platform application. Platform applications may load locally.

A browser-based runtime may be an environment that operates above the native operating system and that uses a multi-process architecture. Thus, if one platform application crashes, a user will not lose other platform applications that are simultaneously also running via the runtime. Each application operates as a new process on the single runtime. A browser-based runtime environment may act as an intermediary that allows a platform application to run on any computing device using any operating system, as long as the runtime is installed on the computing device. The runtime environment may allow the platform application to appear as if it is a native application, while the platform application is not actually being executed through the O/S (but still may be able to access portions of the operating system. In some implementations the browser-based runtime environment may be utilized to execute a web browser.

FIG. 1 is a block diagram illustrating a system 100 that implements messaging between a browser-based application and a native application, in accordance with an example implementation. In various implementations, the system 100 may include client computing devices 102A, 102B, 102C (such as desktop computers, notebook computers, netbook computers, tablet computers, smart-phones, etc.). A client computing device 102A can include one or more processors (CPU) 104 and one or more memories 106. The client computing device 102A can execute an operating system (O/S) 108, and various applications (110 and 124) which may display a user interface window (e.g., web browser 112). The client computing device 102A can include a cache 118. The client computing device 102A can include a native application 124, which may have an associated native messaging host 125. Application 110 is another example of a native application, and the user interface window 112 of application 110 in FIG. 1 is a web browser. Other examples of native applications 124 include word processing applications, image editing applications, email applications, media players, calculators, video conferencing applications, etc. The client computing device 102 may be a computing device shown and described with respect to FIG. 5 below.

As shown in FIG. 1, in one implementation, the client computing device 102A may be running or causing the operating system 108 to execute application 110 or web browser interface 112. The web browser interface 112 may include a plurality of panes or tabs 114A, 114B, 114C. The web browser interface 112 can be a visual area, usually rectangular, containing some kind of user interface. In a graphical user interface (GUI) used in the client computing device 102A, the web browser 112 can be a two-dimensional object arranged on a plane of the GUI known as the desktop. The web browser 112 can include other graphical objects that may be called the "chrome" of the web browser, e.g., a menu-bar, toolbars, controls, icons. The web browser may also include a working area in which a document, image, folder contents, or other main object (e.g., web application 128) can be displayed. The working area may be capable of holding only one main object (i.e., in a single document interface) or more than one main object in a multiple document interface. In some applications, specifically web browsers, multiple documents can be displayed in individual tabs 114A, 114B, 114C. These tabs 114A, 114B, 114C are typically displayed one at a time, and are selectable via a tab-bar which often resides above the contents of an individual window. That is, one selected tab 114A is "forward-facing" and displays information or content to a user in the web browser interface 112, while the content of other tabs 114B, 114C is "hidden." The tabs 114A, 114B, and 114C may execute in separate processes, each with its own individual memory. In other words, the tabs of browser 110 may be functionally isolated from each other so that if tab 114A crashes, tabs 114B and 114C are unaffected. Browser-based web applications may be associated with a tab 114 or may be independent of a tab 114. Thus, the browser 110 may be used to implement other browser-based applications, such as web application 128, extensions, etc., that are functionally isolated from each other and native resources, so as to reduce the risks associated with running web applications or extensions in an open execution environment. In this example, each of the browser-based applications, such as web application 128, may communicate with a native application 124 when native application 124 authorizes such communications even though the browser-based application remains functionally isolated.

As shown in FIG. 1, the system 100 can include a marketplace server 130 that may be connected to the client device 102 through a network 190. Marketplace server 130 can include one or more processors 132, one or more memories 134, an operating system 136, and one or more browser-based applications, such as web application 138. Browser-based applications 138 may be available via server 130, and accessed via browser 110, for example. In some implementations, the web application 138 may be downloaded by a user from the marketplace server 130 via a web browser, such as web browser 110, and may be installed on client computing device 102A as web application 128. The web application 128 and other browser-based applications may operate in a browser-based runtime environment (not shown) that operates above the native O/S 108 and that uses a multi-process architecture. Accordingly, reference to browser 110 may also be considered to refer to a browser-based runtime environment. The web browser 110 may limit access of browser-based applications to native resources 122 for security purposes. Native resources 122 may include any kind of resource included in or locally connected to computing device 102A. For example, native resources 122 may include native windows (e.g., any windows outside a web browser tab), a graphics processing unit (GPU), a web camera, a graphics card, a microphone, a printer, a file system including documents, images, other media, or other resources connected to computing device 102A.

As indicated above, the web browser 110 may include or be associated with one or more browser-based applications, such as web application 128. The browser-based application may be configured to be executed or interpreted by the web browser 110, but does not necessarily use web browser interface 112. This is compared with the native applications (e.g., native application 124) that include machine executable code and are configured to be executed directly by a processor or via the operating system of the client device, whereas, a web application may be incapable of execution or display without the aid of the web browser 110. Thus, web applications and other browser-based applications are run inside a browser environment, although they do not necessarily display web browser interface 112. Examples of web applications include games, photo editors, video players, remote desktop applications, video chat applications, etc., that are run inside the web browser 110. Browser-based applications may also include browser extensions, which may include one or more web pages packaged or grouped together as a definable whole, and configured to extend the functionality to the web browser. Thus, extensions also provide extra functionality to a browser, but generally, unlike web applications, there is little or no user interface component to the functionality provided by an extension. Web browser extensions and web applications can be downloaded for installation in and execution by a browser running on a client computing device.

The client computing devices 102A, 102B, 102C may receive online content from one or more server computing devices 170 that may be connected to the client device 102 through a network 190. Server 170 that can include one or more processors to 172, one or more memories 174, an operating system 176, and one or more native application installation bundles 178. The installation bundle 178 can store computer-executable code that is downloaded to computing device 102 and used to install native application 124 at the request of the user. The installation bundle 178 may include a data file distributed with the native application, such as a manifest file associated with the native application 124, that identifies browser-based applications authorized to communicate with the native application. The information in the manifest file may be provided by the developer of the native application, so that the developer has control over the browser-based applications that can communicate with and use the functionality of the native application. The developer may also include a messaging host executable in the installation bundle that handles communication requests from browser-based applications and translates the requests into actions. The messaging host may be an executable file separate from the native application, so that the native application itself does not include the ability to receive, handle, and respond to communication requests from browser-based applications. Of course, in some implementations the messaging host may be included in the native application executable. In some implementations, the manifest file and native messaging host may be downloaded and installed separately from the native application from the server 170. If downloaded and installed separately, the native messaging host and manifest file are still be considered to be distributed with the native messaging application because they are downloaded from a server associated with the native application.

The manifest file may be part of an application programming interface (API) used to implement a messaging protocol that allows browser-based applications to communicate with a native application, while retaining their functional isolation and limited access to native resources 122. The API may also include message requests handled by the browser 110 that the browser 110 recognizes as requests for communicating with a native application. For example, the API may include a connectNative('<nativeAppName>') function that opens a port for communicating with the native application. The parameter of the function may be the identifier of the native application messaging host that handles communications for the native application. Once a port is opened, the browser-based application may post messages to the port and listen for messages from the port. In another implementation, the browser-based application may communicate with a native application through a sendNativeMessage( ) function. The sendNativeMessage( ) function may include a parameter that identifies the native messaging host, a parameter with the text of the message (e.g., {text: '<message text>' }), and a parameter that identifies a function to handle the response and/or instructions for handling the response. Thus, no port is used for sending a message to and receiving a message from the native application. While only one web application 128 and one native application 124 are shown and described in FIG. 1, it will be appreciated that additional browser-based applications and native applications implemented in the system 100, and the techniques described herein would apply equally to those additional applications.

Figure 2:
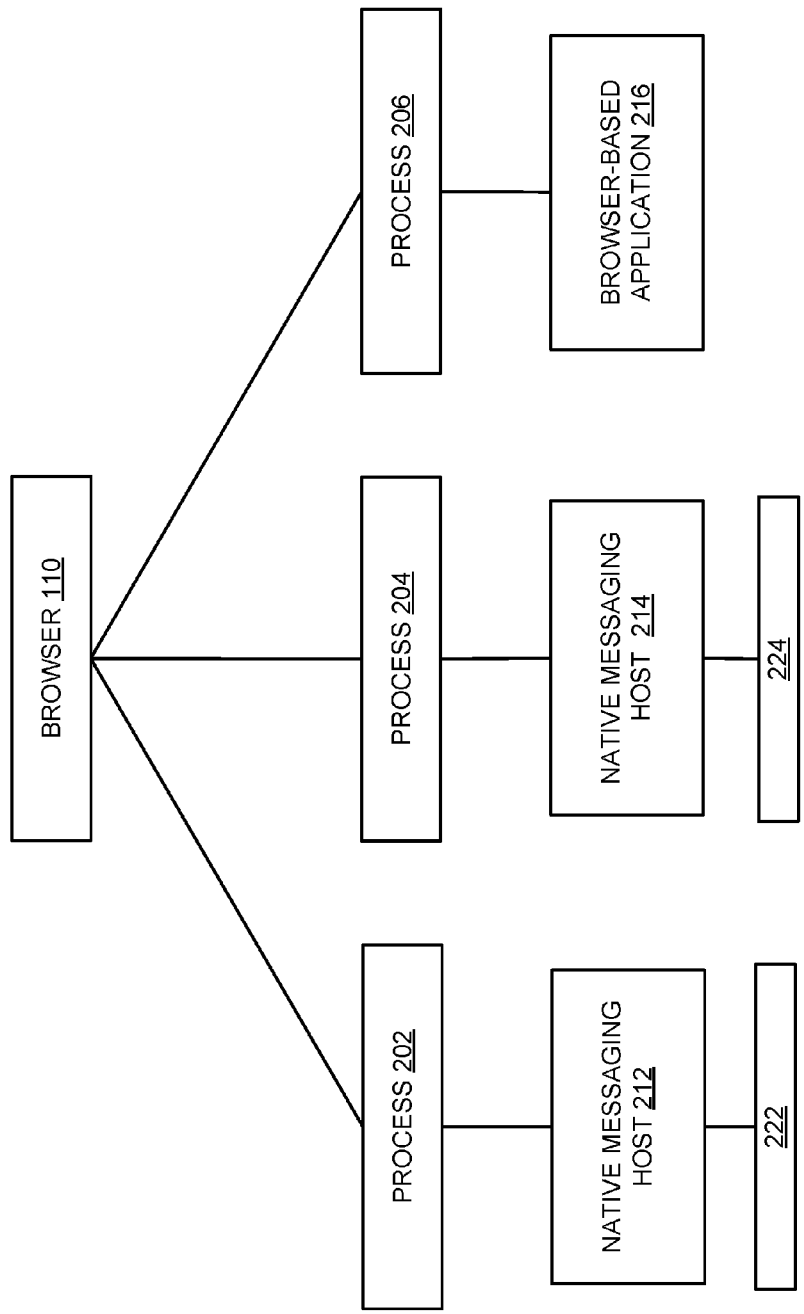
FIG. 2 is an example block diagram of a browser environment using a multi-process configuration.

FIG. 2 is an example block diagram of a multi-process browser configuration, such as browser 110 of FIG. 1. As discussed above, each browser-based application may use a separate process to protect the overall system from bugs or glitches in any of the browser-based applications. Access may be restricted from a browser-based application process to other browser-based application processes, to native messaging host processes, and to the rest of the system, including from native applications and native resources. In this manner, one process running for one application is isolated and separate from other processes running for other applications. A web browser interface (such as web browser interface 112) may be executed using the multi-process browser environment, and may be a type of browser-based application executed it its own process.

As shown in FIG. 2, browser 110 may execute separate processes 202, 204, and 206. A browser-based application 216 may be running on process 206 and may request communications with a native application through browser 110. The browser 110 may create a new messaging port using a new process 202 and use the port to receive messages from and send messages to a native application 222. Alternatively, a browser-based application may request communications without opening a port. When a browser-based application requests communications with a native application, the browser may launch a corresponding native messaging host, such as native messaging hosts 212 or 214, in a separate process. The browser may use the process to communicate with the native application host via standard Input/Output (I/O) streams.

The native messaging host includes functions provided by the native application for communicating with the browser-based application, and may be provided during an install or update of the native application. The native messaging host may be identified in a manifest file, and the manifest file may be identified by information specified in the message request from the browser-based application. Thus, the browser-based application can identify a native application in a communication request, and the browser may use the identification information to launch a native application messaging host. Before launching the native application messaging host, the browser may use the manifest file to determine whether the browser-based application sending the communication request is authorized to communicate with the native application and prevent messages from unauthorized browser-based applications from communicating with the native application. Native messaging hosts 212 and 214 may be capable of handling communication requests between browser-based applications and the native application. For example, the native messaging host 212 may translate messages from a browser-based application into one or a series of actions to be taken by the native application 222. Accordingly, the native messaging hosts 212 and 214 may be configured to access and communicate with native applications 222 and 224 respectively, as examples. The native messaging hosts 212 and 214 may be run in separate process that are not sandboxed so that they can access the system resources. Running the native messaging hosts 212, 214 in separate processes allows one native messaging host to keep running if the other crashes.

Figure 3:
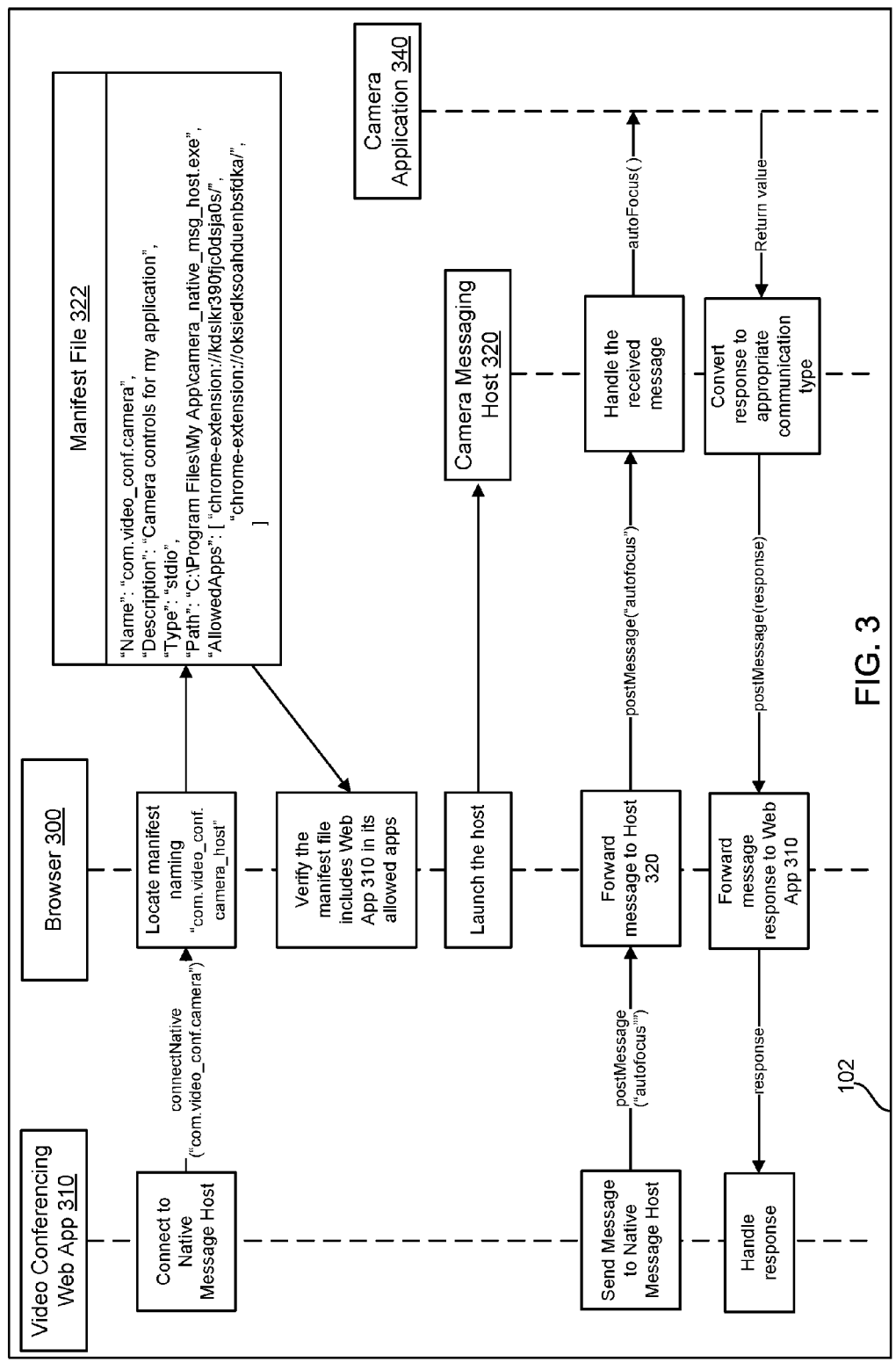
FIG. 3 is an example of a native messaging application programming interface (API) in accordance with an example implementation.

FIG. 3 is a block diagram illustrating an example of the native messaging API in accordance with an example implementation. The example implementation shown and discussed with respect to FIG. 3 is for illustrative purposes only, and is not meant to limit the described methods and systems. Although the example implementation utilizes a web application to manipulate a web-camera, one skilled in the art will understand that the described systems and methods may apply to messaging between any type of browser-based application and native application, for example as described above with respect to FIG. 1. As such, the disclosed systems and methods are not limited simply to video conferencing web applications and native applications that are described with respect to FIG. 3. As other examples, the described systems and methods may be implemented using web applications or browser extensions related to games, videos, storage, weather, finance, productivity, social, business, entertainment, news, computer programming, or any other browser-based application, or combination thereof. Any type and number of browser-based application(s) and native application(s) may be utilized to implement the systems and methods described herein.

As shown in FIG. 3, computing device 102 includes a "Video Conferencing" web application 310, which may represent a web application installed by a user of computing device 102 that is operating browser 110. Video Conferencing web application 310 may execute under the control of browser 300 or a similar multi-process runtime environment. Video Conferencing web application 310 may include, among other capabilities, a capability to manipulate a camera (not shown) that is included as a native resource of computing device 102. For example, the Video Conferencing web application 310 may automatically adjust the focal length of the camera or may have controls that allow the user to manually adjust the camera angle from within the web application. However, the Video Conferencing web application 310 may not have direct access to any native resources of computing device 102, such as the camera, a printer, a file system, USB drives, native application code etc., because of the security model of the browser 300. This lack of access may make the browser more secure from a user's perspective. The computing device 102 may include a camera application 340 that is a native application installed by the user of the computing device 102 that has access to the camera as well as to memory of computing device 102 and other native resources. The camera application 340 may be part of a native application for video conferencing via computing device, etc. In order to protect access to native resources from malware introduced by browser-based applications with malicious intent, the system may limit communications between browser-based applications and native applications to communications from browser-based applications that the native application has expressly authorized. The manifest file 322, which may be distributed with the native application, may be the vehicle for granting such permissions.

For example, a developer of the camera application 340 may provide a browser-based interface in the form of web application 310 and may desire to use functionality provided in the executable code of the camera application 340. In order to gain access to this functionality, the native application developer may provide a camera messaging host 320 and a corresponding manifest file 322. The camera messaging host 320 and the manifest file 322 may be provided with an install or upgrade to the camera application 340. Thus, when a user of computing device 102 installs or upgrades the camera application 340, the installation process may include storing the manifest file 322 in a secure location on computing device 102 and storing executable code for camera messaging host 320. The location of the manifest file may be dependent on the operating system of the computing device 102. For example, the browser 300 may dictate a directory for all manifest files, so that the browser 300 knows where to find the files when a browser-based application initiates a communication request with a native application. In some implementations, the name of the manifest file may be required to match the name of the native messaging host. For example, the native messaging host may be video_conf.camera and the manifest file may be video_conf.camera.json. In some implementations, if the names do not match, the browser may not allow the web application 310 to establish communications with the native application 340. In some implementations, this requirement may be based on the operating system used. In some implementations, the directory may be a secure directory that can only be updated by administrator or root user accounts. In another example, the browser 300 may look for the location of the manifest files in predetermined registry entries. In such an implementation, each string value for the registry key contains a path to or location of a native messaging host manifest file. In some such implementations, the location specified in the string value in the registry must match the location or path of the messaging host stored in the manifest file, for example in a path field, but the name of the manifest file itself may not matter.

In the example of FIG. 3, the Video Conferencing web application 310 may communicate with the camera application 340 by requesting connection with the camera messaging host 320. For example, the web application 310 may send a connectNative( ) message with the name of the desired native message host, for example, "com.video_confcamera". In some implementations, connecting to the native messaging host may include opening a port that the browser 300 uses to communicate with the camera messaging host 320. In another example, the web application 310 may send a message, e.g., sendNativeMessage( ) that identifies the native messaging host without opening a port. When the browser 300 receives a request to connect with the host, either implicitly via a send message request or expressly via a connect request, the browser 300 may locate the manifest file 322 associated with the requested native application messaging host.

For example, the manifest file 322 may include a "Name" field that identifies the native messaging host associated with the manifest file. The name attribute may be the identifier used by browser-based applications when they want to communicate with the native application associated with the host. Because the developer of the native application creates the manifest file 322, the developer can select this identifier. In the example of FIG. 3, the browser would look for a manifest file with the name "com.video_conf.camera" because this is the identifier from the connectNative( ) request. In some implementations, the name must match a particular format, such as *.*.* (e.g., requiring three periods in the name) or a particular letter/number combination at the beginning, or some other regular expression.

When the manifest file 322 is located, the browser 300 may perform some verification checks. For example, the browser 300 may verify that the native host executable identified in a path field of the manifest file 322 matches the name of the manifest file, except for the file extension. In another example, the browser 300 may verify that the web application 310 is identified in the manifest file, for example in an allowed applications or allowed origins field. For example, the browser 300 may attempt to match the identity of the web application 310 with browser-based applications identified in the manifest file 322. If the browser 300 is unable to make a match, the browser 300 may prevent the communication. For example, instead of launching the native message host or instead of passing the message to the native message host, the browser 300 may send a message to the web application 310 indicating the connection request or message was refused or not authorized. The browser 300 may also not establish the port and may not start the native messaging host. In some implementations, the attempted connection may be logged for auditing purposes.

If the browser 300 is able to match the identifiers, the browser 300 may launch the native messaging host identified in the path field of the manifest file 322. For example, the browser 300 may launch camera messaging host 320. In some implementations, the browser 300 starts the camera messaging host 320 in a separate process and communicates with it using the communication type specified in the manifest file 322. A default communication type may be standard I/O (stdio) where communications occur using stdin and stdout. Other communication types may include COM, DBus, etc., depending on the operating system used by computing device 102. In some implementations, the message sent to the native messaging host may be limited to text messages. For example, the message may be a JavaScript Object Notation (JSON) blob in UTF-8 encoding. A JSON blob is a string representation of an object and not an object itself and can be passed in a text message. Accordingly, the messages may be passed from the web application 310, through the browser 300, to native messaging host 320 using stdin and the native messaging host 320 may use stdout to send messages back to the web application 310.

If the web application 310 opens a port, the web application 310 may then send messages to and receive messages from the native messaging host 320 using that port. For example, the web application 310 may send an "autofocus" message to the native messaging host 320. The camera messaging host 320 may receive the message and handle it. For example, the camera messaging host 320 may translate the received message into one or more actions to be performed by the camera application 340. As another example, the host 320 may translate the message into another format, e.g., a COM interface, and pass the translated message to some other process. The other process may or may not be part of the native application 340. In some implementations, the native application 340 may send a message back to the web application 310. For example, the native application 340 may send the message or a return value to the native messaging host 320, which may convert the response into a text message or other allowable communication type, and send the message to the browser 300, which forwards the message to the web application 310. The web application 310 may have a listener for the port that receives incoming messages from the native messaging host 320 and handles the return message.

In some cases, a browser-based application, a native messaging host, or a native application may experience errors. By having a browser act as an intermediary for messages between the native application and the browser-based application, the browser may cleanly handle such errors. As an example, camera application 340 may crash when a request to pan includes a parameter out of range. Because the browser 300 is the intermediary, if the camera application 340 crashes when panning the camera, the browser 300 may send a message back to Video Conferencing web application 310 saying that the previous request was "interrupted." That way the Video Conferencing web application 310 knows to try again before sending another message or may prompt the user of computing device 102 for a different instruction. The manifest file enables a company to create a browser-based application that can take advantage of functionality in its native application without giving unrestricted access to the user's machine through the browser-based application. Thus, the company can tightly control access to the native application's functionality and the browser can maintain control over unauthorized access to native resources. Unauthorized browser-based applications that attempt to communicate with the native application may be stopped and optionally logged by the browser. Furthermore, manifest files stored in secure locations may prevent successful installation of fake messaging hosts.

Although the example of FIG. 3 shows an implementation using a native application messaging host separate from the native application, it is understood that the native application messaging host may be included in the native application. Thus, for some implementations, reference to the native application messaging host may be understood to include the native application itself.

Figure 4:
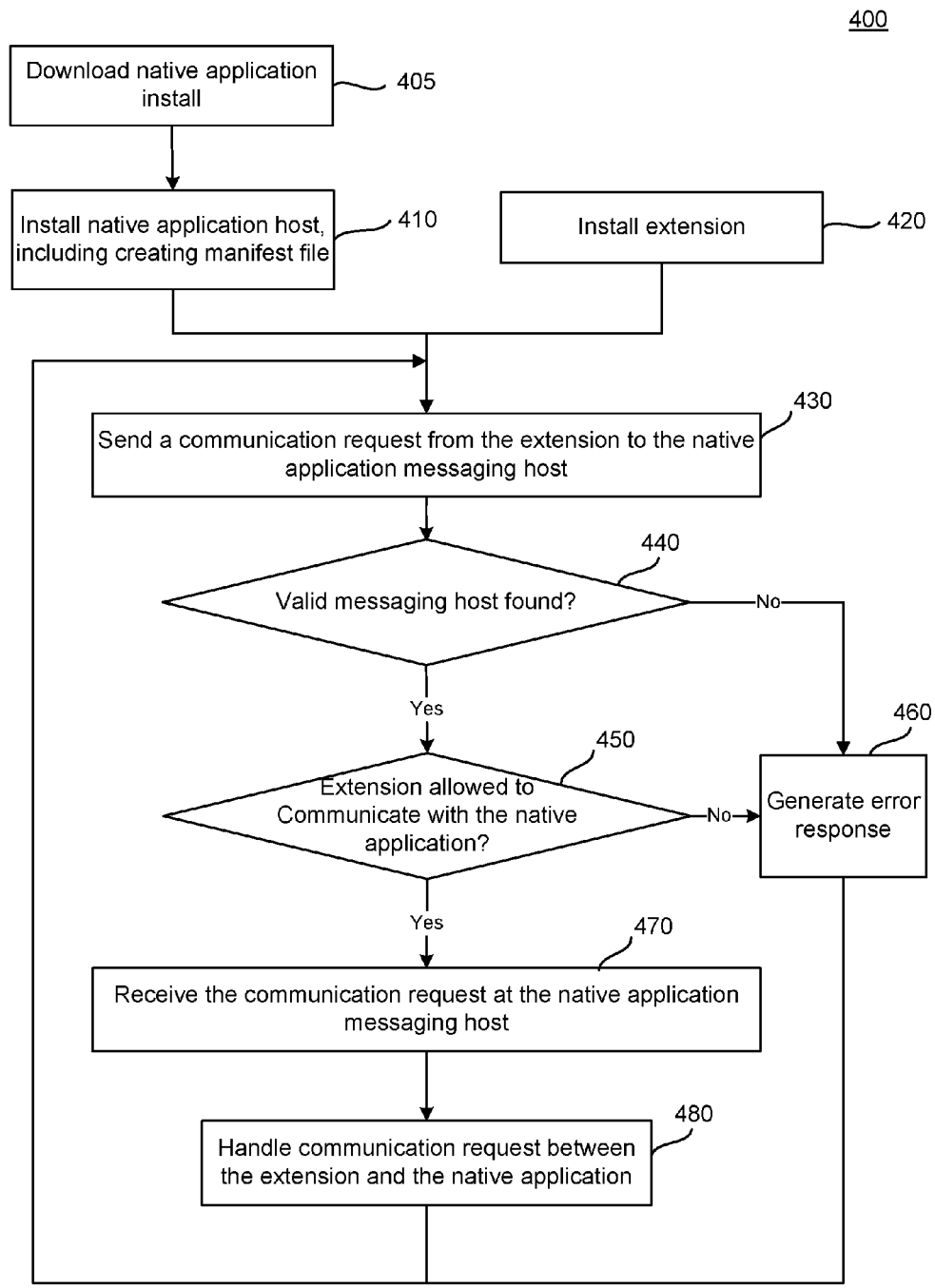
FIG. 4 is a flowchart illustrating a method for native application messaging with a browser-based application in accordance with disclosed implementations.

FIG. 4 is a flowchart illustrating a method 400 for native application messaging, in accordance with an example implementation. The method 400 may be implemented using the browser 110 shown in FIG. 1 or the browser 300 shown in FIG. 3. It will be appreciated, however, that other configurations and techniques may be used to implement the method 400.

The method 400 includes, at block 405, downloading a native application install. For example, the user of a computing device may download an install file or package from a server accessible via a network, such as the Internet, using any conventional technique. Of course, the install file or package may also be downloaded from a disk drive, a USB drive, or some other computer-readable memory device. In some implementations, the install may be an upgrade to the native application rather than an original install. At block 410, the install may be executed, causing the computing system to store a manifest file and a native application host executable on a memory of the computing device accessible to the computing device. The manifest file may include information identifying browser-based applications authorized to communicate with the native application. In some implementations, the manifest file may be stored in a directory predetermined by the browser or browser environment of a computing device, such as browser 300, as shown in FIG. 3. The predetermined directory may be a directory with restricted access, for example writable only by an administrative or root user of the computing device. In some implementations, the manifest file may be stored in any directory, but the location of the install file may be inserted into a registry. The registry may be updateable only by an administrator of the computing device. The manifest file may also specify the location of the native application messaging host.

At block 420 the method 400 includes downloading and installing a browser-based application, such as an extension or web application. In some implementations, the install may be part of or result from installing the native application. In some implementations, the user of the computing device may select the browser-based application from a web store that caters to the browser and may be installed independently of the native application. The installed extension may have an identifier used by the web store and/or the browser to facilitate communications between the extension and the browser, other browser-based applications, and native applications. The method 400 further includes, at block 430, sending a communication request from the extension to the native application messaging host. The communication request may be a message or a request to open a communications port. The web browser, or a browser runtime environment, may receive the request, acting as an intermediary between the browser-based application and the native application.

At block 440 the browser may determine whether the native messaging host (or native application) identified in the request is valid or not. The browser may use the manifest file to do the determining. For example, the browser may look for a manifest file associated with the native messaging host identified in the request. Additionally, in some implementations the browser may verify that the name of the manifest file matches the name of the native messaging host. If the native messaging host is found, e.g., a matching manifest file is located, at block 450 the browser may determine whether the extension is allowed to communicate with the native application. For example, the manifest file may identify one or more browser-based applications that are allowed to communicate with the native application. If the extension is one of the applications, (450, Yes), at block 470 the browser may start the native application messaging host and/or send the communication request to the native application messaging host. In some implementations, the browser may use the communication mechanism defined by the manifest file to communicate with the native messaging host. If the native messaging host does not support the communication mechanism identified in the manifest file, communication may not be possible. The native application messaging host may handle the communication request at block 480. This may include translating the received request into one or more actions to be performed by the native application and initializing the actions. For example, the message in a communication request may be a text message that the native application messaging host may use to determine the set of actions. The native application messaging host may handle the message in any manner determined by the author of the host. As described above, the native application itself may be capable of acting as a messaging host and the browser may launch the native application as part of forwarding the message.

If the browser does not find a valid manifest file or the messaging host is not verified (440, No) or if the extension is not a browser-based application allowed to communicate with the native application (450, No), the browser may generate an error response at block 460. The error response may include sending an error code or message back to the extension, logging the request for auditing purposes, failing to open a communications port with the native application messaging host, etc. If the browser generates an error response at block 460, it does not forward the communication request to the native application messaging host. The system may repeat Blocks 430-460 as needed while the extension is running. Process 400 may end when the extension closes the port, if one was opened, or when the extension receives a response from the native application messaging host if no port was opened.

As illustrated, the API allows a browser-based application to send a communication to a native application. If the native application responds to the request via the API, the response may be sent back to the browser-based application. However, API allows the native application to control which browser-based applications can send requests by identifying, before a request is sent, which browser-based applications are authorized. In some implementations, this may occur using a manifest file provided by the native application. A native application messaging host and the browser or a browser-like runtime environment may implement the API, so that the native application does not need to be modified to receive, verify, and respond to communication requests.

Figure 5:
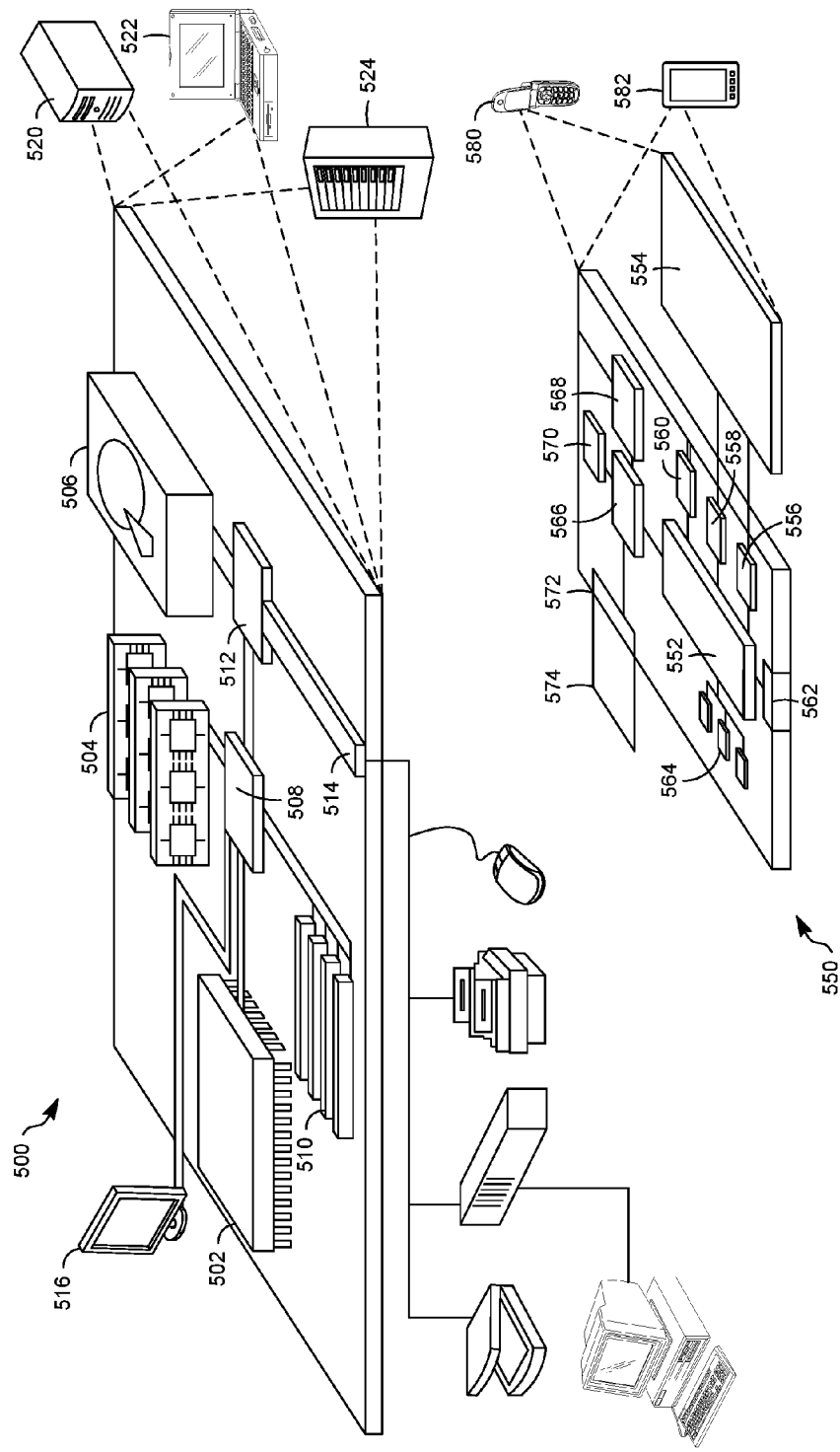
FIG. 5 is a diagram illustrating a computing device and a mobile computing device that can be used to implement the techniques described herein in accordance with an example embodiment.

FIG. 5 is a diagram that shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, which may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, but the medium excludes any transitory propagating signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for mediating a communication request between a native application and a browser-based application on a computing device, the method comprising:
    receiving, using at least one processor, the communication request from the browser-based application, wherein the communication request specifies a native application messaging host, message content, and at least one parameter that identifies a function to handle a response from the native application;
    accessing the function using a data file associated with the native application messaging host and comparing predefined criteria from the data file to a name corresponding to the native application messaging host;
    in response to determining a match between the name corresponding to the native application messaging host and the predefined criteria, authorizing the browser-based application to communicate with the native application and requesting a translation of the message content;
    receiving the translated message content, the translation including a plurality of actions to be performed by the native application; and
    performing the plurality of actions based at least in part on authorizing communication with the native application.

2. The method of claim 1, further comprising:
    in response to determining that the name does not match the predefined criteria, preventing transmission of the message content.

3. The method of claim 1, wherein the communication request includes a request generated using a messaging protocol that enables communication between the browser-based application and the native application.

4. The method of claim 1, wherein the communication request includes a request generated using an MMS messaging protocol.

5. The method of claim 1, wherein receiving the communication request from the browser-based application and providing a request from the native application are performed without using a port.

6. The method of claim 1, wherein the plurality of actions to be performed by the native application are provided in a predetermined execution order.

7. The method of claim 1, wherein the data file comprises a manifest file that is downloaded separate from the native application.

8. The method of claim 1, wherein the data file is included as part of an application programming interface configured to implement a messaging protocol that allows browser-based applications to communicate with native applications, the messaging protocol providing limited access to a plurality of native resources associated with the computing device.

9. The method of claim 1, wherein the native application messaging host includes an executable file installed separate from the native application.

10. The method of claim 1, further comprising initiating the native application messaging host in a separate process when it is determined that the browser-based application is authorized.

11. A system comprising:
    at least one processor;
    a native application;
    a manifest file distributed with the native application, the manifest file including,
    a native application messaging host distributed with the native application, and
    memory storing instructions that, when executed by the at least one processor, cause the system to perform operations including:
        receiving, using the at least one processor, a communication request from a browser-based application, wherein the communication request specifies the native application messaging host and message content;
        using a data file associated with the native application messaging host and comparing predefined criteria to a name corresponding to the native application messaging host;
        in response to determining a match between the name corresponding to the native application messaging host and the predefined criteria, authorizing the browser-based application to communicate with the native application and requesting a translation of the message content;
        receiving the translated message content, the translation including a plurality of actions to be performed by the native application; and
        performing the plurality of actions based at least in part on authorizing communication with the native application.

12. The system of claim 11, wherein the manifest file further includes a communication type and the browser-based application accesses a native resource via a text message using the communication type.

13. The system of claim 11, wherein the manifest file is copied to a secure location as part of installing the native application.

14. The system of claim 13, wherein the secure location is a secure directory predetermined by a browser process.

15. A non-transitory, machine-readable medium for mediating a communication request between a native application and a browser-based application on a computing device, the machine-readable medium having instructions stored thereon, that when executed by a processor, cause a computing device to:
    receive, using at least one processor, the communication request from the browser-based application, wherein the communication request specifies a native application messaging host, message content, and at least one parameter that identifies a function to handle a response from the native application;
    access the function using a data file associated with the native application messaging host and comparing predefined criteria from the data file to a name corresponding to the native application messaging host;
    in response to determining a match between the name corresponding to the native application messaging host and the predefined criteria, authorizing the browser-based application to communicate with the native application and requesting a translation of the message content;

receive the translated message content, the translation including a plurality of actions to be performed by the native application; and perform the plurality of actions based at least in part on authorizing communication with the native application.

16. The medium of claim 15, further comprising:

in response to determining that the name does not match the predefined criteria, preventing transmission of the message content.

17. The medium of claim 15, further comprising wherein the communication request includes a request generated using a messaging protocol that enables communication between the browser-based application and the native application.

18. The medium of claim 15, wherein the communication request includes a request generated using an MMS messaging protocol.

19. The medium of claim 15, wherein receiving the communication request from the browser-based application and providing a request from the native application are performed without using a port.

20. The medium of claim 15, wherein the data file is included as part of an application programming interface configured to implement a messaging protocol that allows browser-based applications to communicate with native applications, the messaging protocol providing limited access to a plurality of native resources associated with the computing device.

\* \* \* \* \*